United States Patent
Yu et al.

(10) Patent No.: US 11,906,078 B2
(45) Date of Patent: Feb. 20, 2024

(54) PIPE COUPLING ASSEMBLY AND METHOD

(71) Applicant: Polyflow LLC, Midland, TX (US)

(72) Inventors: Liang Yu, Midland, TX (US); James Fenwick Mason, Midland, TX (US)

(73) Assignee: Polyflow LLC, Midland, TX (US)

( * ) Notice: Subject to any disclaimer, the term of this patent is extended or adjusted under 35 U.S.C. 154(b) by 372 days.

(21) Appl. No.: 17/018,246

(22) Filed: Sep. 11, 2020

(65) Prior Publication Data

US 2022/0082188 A1    Mar. 17, 2022

(51) Int. Cl.
*F16L 13/10* (2006.01)
*F16L 9/12* (2006.01)

(52) U.S. Cl.
CPC .............. *F16L 13/103* (2013.01); *F16L 9/12* (2013.01)

(58) Field of Classification Search
CPC ....... F16L 13/103; F16L 9/12; F16L 2011/047
See application file for complete search history.

(56) References Cited

U.S. PATENT DOCUMENTS

| | | | | |
|---|---|---|---|---|
| 3,961,814 A | * | 6/1976 | Byrne | F16L 13/00 |
| | | | | 525/138 |
| 4,718,698 A | * | 1/1988 | Hill | B29C 66/91221 |
| | | | | 285/31 |
| 4,775,501 A | | 10/1988 | Rosenzweig et al. | |
| 5,346,261 A | * | 9/1994 | Abbema | F16L 13/0263 |
| | | | | 285/55 |
| 6,595,559 B1 | * | 7/2003 | Readman | F16L 13/141 |
| | | | | 285/382 |
| 2005/0134045 A1 | * | 6/2005 | Mohan | F16L 21/002 |
| | | | | 285/370 |
| 2007/0200342 A1 | | 8/2007 | Roberts-Moore et al. | |
| 2010/0295299 A1 | * | 11/2010 | Ziu | B29C 66/1286 |
| | | | | 219/643 |
| 2014/0353964 A1 | * | 12/2014 | Van Der Donk | B29C 66/52291 |
| | | | | 156/60 |
| 2015/0219254 A1 | * | 8/2015 | Lee | B29C 65/5057 |
| | | | | 285/294.1 |
| 2017/0343136 A1 | | 11/2017 | Daugherty et al. | |

FOREIGN PATENT DOCUMENTS

KR    20070112933 A    11/2007
WO    2013120201 A1    8/2013

OTHER PUBLICATIONS

International Search Report and Written Opinion dated Dec. 16, 2021 issued in PCT Application No. PCT/US2021/049265.

\* cited by examiner

*Primary Examiner* — James M Hewitt, II (74) *Attorney, Agent, or Firm* — Troutman Pepper Hamilton Sanders LLP; Christopher C. Close, Jr.; Brandon M. Reed (57) ABSTRACT

A pipe coupling assembly for joining two sections of polymer pipe, the pipe coupling assembly comprising: an insert configured for positioning within an end region of a first section of polymer pipe and an end region of a second section of polymer pipe, such that an annular gap is formed between the insert and the end regions of polymer pipe; an adhesive configured for sealing the annular gap between the insert and the end regions; and an external coupler for positioning over the end regions and joining the first and second sections of polymer pipe.

15 Claims, 4 Drawing Sheets

PIPE COUPLING ASSEMBLY AND METHOD

The present invention relates to a pipe coupling assembly and method. In particular, but not exclusively, the present invention relates to a pipe coupling assembly for joining two sections of multilayer polymer pipe, a method of joining two sections of polymer pipe, and an insert for use in the pipe coupling assembly.

The multilayer polymer pipes suitable for the invention may be used in transporting and/or distributing oilfield fluids, such as water, gas (methane, ethane, $CO_2$ etc.) and hydrocarbon liquids, or other fluids such as hydrogen. Mulitlayer polymer pipes may be used onshore (over land) or in very shallow water applications (for instance less than 50 m water depth).

Structurally, multilayer polymer pipes may comprise a simple construction, without intermediate reinforcement layers, comprising two or more polymer sub-layers each of which may be similar or different polymer types (see for example US2018/0187802A1).

Alternatively, multilayer polymer pipes may comprise a more complex, multi-layer structure, incorporating at least one intermediate reinforcement layer to withstand internal pressure and/or tension in the pipe when in use. The various layers of the pipe may all be bonded to each other or some layers may remain at least partly un-bonded from adjacent layers. The multilayer polymer pipes related to the invention may be suitable for internal pressures up to 3000 psi. Multilayer polymer pipes may comprise MDPE, HDPE, XLPE, PE-RT, polyamides (e.g. PA-12, PA-66, PA-6), thermoplastic elastomers, flexible polyvinyl chloride, Acrylonitrile butadiene styrene (ABS), polyphenylene sulfide (PPS), or other polymers or polymer alloys. Multilayer polymer pipes may comprise filled polymers where the polymer contains a portion of a filler material, such as fibres or particles. Multilayer polymer pipes may comprise intermediate reinforcement layers which comprise long fibres, fibre strands, braids and the like, the filaments of which may be from one or more of glass, carbon, aramid, basalt, or polyester, and which may also comprise a matrix material of a thermoplastic polymer. Fibres and/or strands or braids of fibres may be wound around the pipe in a helical manner, with lay angles optimised for pipe performance (the higher the angle the greater the pressure retainment capability, the lower the angle the greater the tension capability), or interwoven into a braid around the pipe. Layers of reinforcements may be applied sequentially at different angles to optimise and torsionally balance the structure in manufacture and use.

A multilayer polymer pipe can be relatively low-cost, with more vulnerable structural layers such as HDPE being protected from chemical attack by a chemically resistant engineering polymer layer, for example a polyamide (such as PA12). Chemical attack usually reduces the strength of the structural layer. This is often accounted for in pipe designs by application of a fluid service factor that reduces the maximum allowable operating pressure by some factor, for example 50 percent. With a proper chemical barrier layer the multilayer polymer pipe can be operated without chemical de-rating factors applied to the design.

A major vulnerability of the chemical barrier layer in pipes is interruption of the chemical barrier layer at each pipe joint when joined with conventional techniques. This can limit the use of the product because there is little or no convincing evidence that interruption of the chemical barrier layer does not adversely impact the long-term strength of the pipe.

Joining of multilayer polymer pipe using conventional methods such as butt fusion and electrofusion results in exposure of the structural layer to the pipeline fluids at the end of each multilayer polymer pipe segment.

In the case of butt fusion, when two melted ends of pipe are pressed together, some polymer expelled from the joint area, rolling back away from the joint leaving an exposed ring of polymer from the centre of the pipe wall. As a result, the chemical barrier layer of the pipe is completely absent from the surface of the rolled-back fusion bead. The structural layer (e.g. HDPE) is therefore left exposed and vulnerable to attack. This makes butt fusion unsuitable for joining multilayer polymer pipes in applications where chemical attack is likely.

Electrofusion couplers are another popular means of joining multilayer polymer pipes. Conventional designs still leave the cut ends of the pipes exposed to the bore fluids. Although most electrofusion couplers have internal stops to properly position the two cut pipe ends in the coupler, there is no provision for maintaining a continuous layer on the interior surface. The joining is done entirely on the outer surface of the pipe ends.

Victaulic® couplers are another popular means of quickly joining HDPE pipe. Such couplers include a gasket between the exposed pipe ends, but there is no assurance that the vulnerable pipe material sub-layers, for example polyolefins such as HDPE, will not be exposed to fluids.

According to a first aspect of the present invention there is provided a pipe coupling assembly for joining two sections of multilayer polymer pipe, the pipe coupling assembly comprising: an insert configured for positioning within an end region of a first section of multilayer polymer pipe and an end region of a second section of multilayer polymer pipe, such that an annular gap is formed between the insert and the end regions of multilayer polymer pipe; an adhesive configured for sealing the annular gap between the insert and the end regions; and an external coupler for positioning over the end regions and joining the first and second sections of multilayer polymer pipe.

This advantageously provides a fluid-tight seal across the joint between adjacent pipe ends such that the multilayer polymer pipe can be operated without chemical derating factors applied to the design of the pipe.

The insert may comprise a mechanical stop for abutting against the end of at least one of the multilayer polymer pipe sections. The mechanical stop may comprise an annular flange extending from an outer surface of the insert. The annular flange may be positioned substantially centrally along the length of the insert. The annular flange may be configured to extend from the outer surface of the insert to the outer surface of the abutting multilayer polymer pipe, in use.

An inner surface of the insert may taper outwardly at each end region of the insert.

The insert may comprise a first and second annular lip on an outer surface thereof for retaining the adhesive in the annular gap in use. The first annular lip may be positioned at a first end of the insert and the second annular lip may be positioned at a second end of the insert. Each of the first and second annular lips may be configured to extend from the outer surface of the insert to the inner surface of the multilayer polymer pipe.

The insert may comprise a substantially uniform (or smooth) outer profile or surface.

Alternatively the outer surface may comprise annular grooves, spiral recesses or undulations in order to retain and direct the adhesive between the insert outer surface and the pipe inner surface.

Aptly the insert may comprise channels to direct the adhesive to and along the length of the insert.

The adhesive may be configured for adhesion to polyamides (for example PA-12, PA-66 or PA-6). Adhesives may be configured for adhesion to other engineering polymers, such as polyphenylene sulfide (PPS), polyketones, thermoplastic elastomers (TPE), flexible polyvinyl chloride (PVC), and thermoplastic polyesters and copolyesters. An example of a suitable adhesive is Nylink available from GF Piping Systems.

The adhesive may comprise at least one of acrylic (including reactive liquid acrylic which may be based on a high-molecular-weight acrylic polymer in which polymerization is initiated by a peroxide) or urethane or epoxy adhesives or liquid silicone rubber.

The insert may be configured such that the annular gap between the insert and the end regions of multilayer polymer pipe is from 0.2 mm to 5 mm. Aptly the annular gap is configured to be from 0.2 mm to 2 mm. It will be appreciated that the size of the annular gap may vary around the circumference of the pipe. For example, either the pipe or the insert may not be perfectly circular in cross-section. As such, the gap between the insert and the pipe may be larger in some areas compared to others. After the insert is positioned within the pipe, it may generally adopt the shape of the pipe, with a relatively small or minimal annular gap therebetween. Alternatively, the process of insertion of the insert within the end regions of multilayer polymer pipe may result in at least partial re-rounding of the pipe in those regions, resulting also in the insert and the pipe adopting a similar shape with relatively small or minimal annular gap therebetween.

The external coupler may be an electrofusion coupler. The electrofusion coupler may be configured to bond to an outer surface of the end regions of multilayer polymer pipe. The external coupler may be a mechanical coupler.

The sections of multilayer polymer pipe may be triple-layer co-extruded polymer pipe. The external coupler may be configured to join outer layers of the triple-layer co-extruded polymer pipe sections.

According to a second aspect of the present invention there is provided an insert comprising: a tubular body configured for positioning within an end region of a first section of multilayer polymer pipe and an end region of a second section of multilayer polymer pipe, such that an annular gap is formed between the tubular body and the end regions of multilayer polymer pipe, and an adhesive layer on an outer surface of the tubular body. In use, the adhesive layer seals the annular gap between the insert and the end region.

According to a further aspect of the present invention there is provided a multilayer polymer pipe assembly comprising: a first section of multilayer polymer pipe; a second section of multilayer polymer pipe; an insert positioned within an end region of the first section of multilayer polymer pipe and an end region of a second section of multilayer polymer pipe, such that an annular gap is formed between the insert and the end regions of multilayer polymer pipe; an adhesive sealing the annular gap between the insert and the end regions; and an external coupler positioned over the end regions and joining the first and second sections of multilayer polymer pipe.

The first and second sections of multilayer polymer pipe may each comprise an inner layer and an outer layer.

The inner layer may comprise a chemical barrier layer. The chemical barrier layer may comprise a dispersion of a reactive material which will interact with gases permeating through the polymer material and/or an inactive material which will inhibit their passage. The chemical barrier layer may also comprise a film of material which limits or eliminates the permeation of gas species through the polymer. Alternatively, the chemical barrier layer may comprise a polymer material which is inert to the types of gas species which would be present in the bore fluids carried through the pipe. Such materials may include, but not be limited to, polyamides (e.g. PA 12, PA-66, PA-6), thermoplastic elastomers (TPE), flexible polyvinyl chloride, Acrylonitrile butadiene styrene (ABS), polyphenylene sulfide (PPS), polyketones, fluoropolymers and the like, or other polymers or polymer alloys.

The inner layer and the outer layer may also be delineated by a further intermediate structural support layer. The intermediate structural support layer may comprise fibre reinforcements. The fibre reinforcements may comprise at least one of short, continuous or semi-continuous lengths of fibre, optionally wound or braided around the pipe in a helical manner. The fibre reinforcements may include fibre types being at least one of glass, basalt, aramid, polymer (e.g. polyester), carbon, or metal; alternatively strips or films of metal may be employed as a structural support layer and/or as a permeation barrier. Alternatively, woven or knitted strips of material may be utilised where there are fibres or strands arranged in multiple orientations (for instance warp and weft).

Alternatively, the intermediate structural support layer may comprise an adhesive polymer, for example comprising polyethylene with maleic anhydride functional groups. In this example the maleic anhydride functional groups in the intermediate structural support layer may form chemical bonds, e.g. covalent bonds, with both polyamide molecules of the inner layer and high density polyethylene in the outer layer, providing superior peel strength under high temperatures.

The outer layer may also comprise a structural support layer. For low pressure applications (such as those without an intermediate structural support layer) the outer layer may comprise a polymer or for higher pressures it may comprise a short fibre polymer composite. The outer layer may comprise a polymer material which will typically be a polyolefin, such as MDPE, HDPE, XLPE, PE-RT, flexibilized polypropylene, TPE or the like. The outer layer may comprise additives which enhance it's resistance to wear or abrasion or impact resistance. The outer layer may comprise a further sub-layer on the outer surface of the layer which is wrapped or wound to provide wear or abrasion or impact resistance. Such a sub-layer may include a tape comprising fibres or wires. Such sub-layers may only be present on distinct length-sections of the multilayer polymer pipe and may be removed before application of end fittings according to this invention.

According to a further aspect of the present invention there is provided a method of joining two sections of multilayer polymer pipe, the method comprising: providing a surface of an insert with an adhesive coating; locating a first end of the adhesive coated insert within an end region of a first section of multilayer polymer pipe and locating a second end of the adhesive coated insert within an end region of a second section of multilayer polymer pipe such that the adhesive seals an annular gap between the insert and the end regions; and joining the first and second sections of multilayer polymer pipe together using an external coupler positioned over the end regions. The present method advantageously utilises existing techniques for coupling pipe sections together, whilst providing an improved joint, thus providing a method that can be easily used by existing pipeline installers.

The insert may comprise a transfer sheet disposed on the adhesive coating. The step of providing the adhesive coating may comprise removing the transfer sheet from the adhesive coating.

Certain embodiments of the invention provide an improved pipe coupling compared to previously known techniques.

Certain embodiments of the invention provide a coupling in which ends of the pipe sections are sealed from fluid flowing through the pipe.

Embodiments of the invention are further described hereinafter with reference to the accompanying drawings, in which:

FIGS. 5 to 7 illustrate sectional views of various example inserts;

In the drawings like reference numerals refer to like parts.

Figure 1:
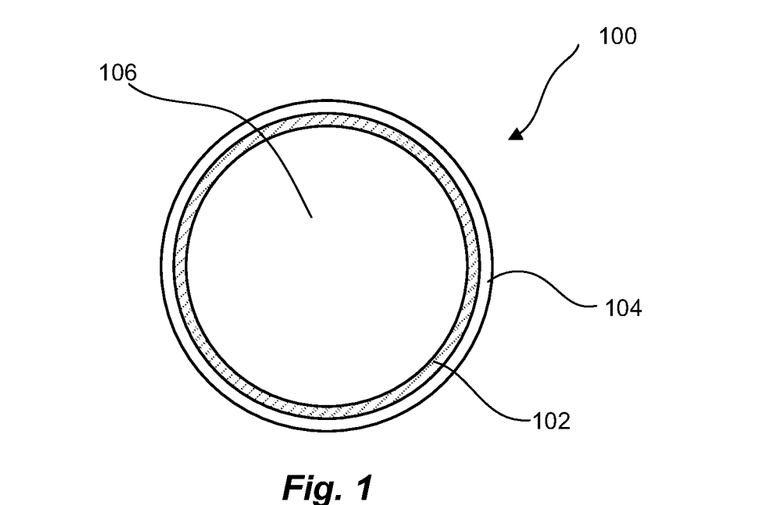
FIG. 1 illustrates a cross-section of an example of a multi-layer polymer pipe.

FIG. 1 illustrates a cross-sectional view of an example multilayer polymer pipe 100. The multilayer polymer pipe 100 includes an inner layer 102 and an outer layer 104.

The outer layer 104 may generally define a structural layer of the multilayer polymer pipe 100. That is, the outer layer 104 may be a structural support layer providing strength to the pipe 100. The outer layer 104 provides support to the inner layer 104 and helps to prevent collapse of the pipe 100 due to external forces. The outer layer 104 may be formed from various polymers depending on strength requirements of the pipe, for example Polyethylene (PE—typically of medium or high density), cross-linked polyethylene (XLPE), flexiblised Polypropylene, Thermoplastic Elastomer, Polyketone or Polyvinylchloride. The polymer of the outer layer may also comprise additives, known to polymer resin manufacturers, for improving UV resistance, enhancing heat resistance and/or chemical stability. The polymer of the outer layer may also comprise colorants which, in addition to the coloring of the polymer also provide a degree of chemical or environmental stability to the polymer. For example, carbon black may be added to color the polymer and improve aging characteristics; alternatively a titanium dioxide based colorant may be added to improve UV resistance and heat stability in direct sunlight.

The inner layer 102 functions as a fluid barrier layer and generally defines a pipe bore 106, through which fluids may flow in use. The inner layer 102 may aptly be a chemical barrier layer. That is, the inner layer 102 may be formed from a material resistant to chemical attack, to thereby protect the structural outer layer 104 from fluid flowing through the pipe bore 106. This can help to maintain strength and reduce wear or chemical damage to the structural outer layer 104 over time. The inner layer 102 may be formed from various polymers depending on the fluid to be transported within the pipe, for example polyamides (e.g. PA-12, PA-66, PA-6), Polyphenylene Sulfide (PPS), polyketones, Polyetherketoneketones (PEKK), Polyetheretherketones (PEEK) or fluoropolymers, such as Perfluoroalkoxy alkane (PFA), MFA (specialty grades of PFA resulting from the polymerization of TFE and perfluoromethylvinyl ether (PFPME), or polyvinylidene difluoride (PVDF).

The multilayer polymer pipe 100 may be used for transporting fluids, for example hydrocarbons including oil and gas, $CO_2$, hydrogen or water (including drinking water).

Generally the multilayer polymer pipe 100 may be used for transporting fluids on shore or in shallow water applications. As used herein, the term "shallow water" encompasses water depths of up to 50 metres.

The operating pressure (maximum pressure of fluid in the bore 106) of the multilayer pipe may vary for different uses, but generally operates at relatively low pressure, for example pressures up to 3000 psi (around 21 MPa).

The multilayer pipe 100 may have an internal diameter of from around 1 inch (2.5 centimetres) to 8 inches (20.3 centimetres) and an external diameter of from around 1.25 inches (3.2 centimetres) to 9 inches (22.9 cm centimetres) Each of the inner layer 102 and the outer layer 104 of the pipe 100 may have a radial thickness from around $\frac{1}{32}$ inch (0.8 millimetres) to $\frac{5}{8}$ inch (16 millimetres). However, this is only limited by equipment capability and resulting (or desired) bending stiffness in the pipe.

In other examples, the multilayer pipe 100 may have an internal diameter of up to 30 inches (76 centimetres), with a total radial thickness of up to 4 inches (10 centimetres).

The multi-layer pipe 100 may be provided in discrete lengths of, for example, from 10 meters to 400 meters, for example 300 meters. In order to transport fluids over greater distances, it is therefore necessary to couple two or more lengths of pipe (pipe sections) together to form a longer length of pipe.

Figure 2:
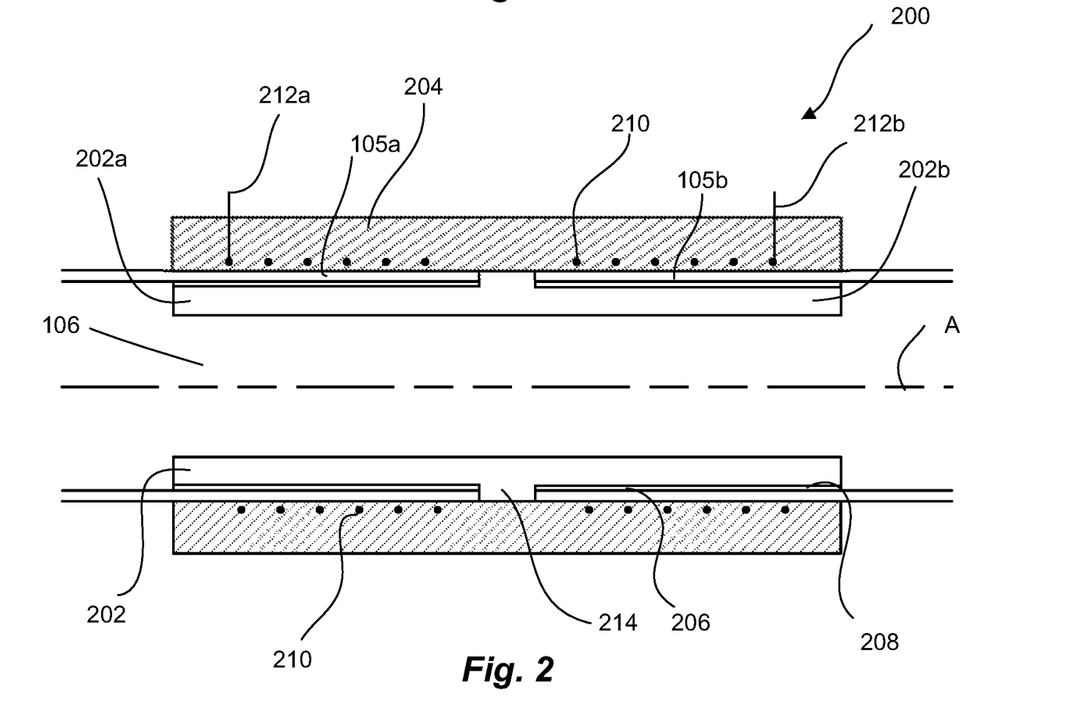
FIG. 2 illustrates a sectional view of an example of a pipe coupling assembly.
Figure 3:
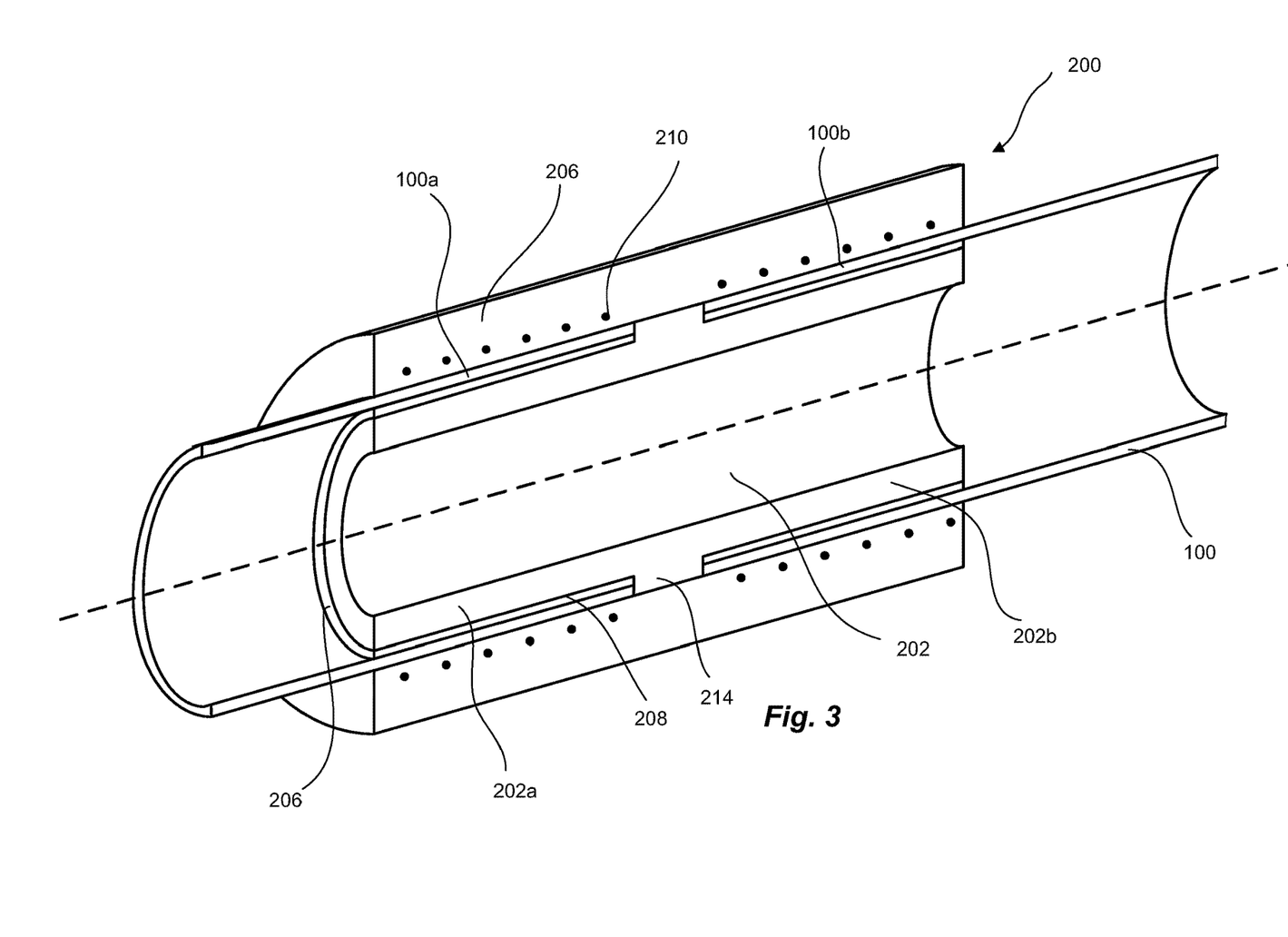
FIG. 3 illustrates a cut through perspective view of the pipe coupling assembly of FIG. 2.

FIGS. 2 and 3 illustrate an example of a pipe coupling assembly 200 for joining two sections of multilayer polymer pipe 100a, 100b. The sections of multilayer polymer pipe 100a, 100b may be the same as that described above in relation to FIG. 1, though for clarity the pipe layers are not shown in FIGS. 2 and 3. The pipe coupling assembly 200 includes an insert 202, an external coupler 204, and an adhesive 206.

The insert 202 is configured for positioning within an end region 105a of the first section of multilayer polymer pipe 100a and an end region 105b of the second section of multilayer polymer pipe 100b. That is, the insert 202 is sized and shape such that it can be inserted into the end regions 105a, 105b of the multilayer polymer pipe 100a, 100b. The insert 202 therefore has a cross-sectional shape that generally corresponds to the cross-sectional shape of the end regions 105a, 105b of multilayer polymer pipe. The outer diameter of the insert 202 is sized such that the insert 202 can be received within the end regions 105a, 105b of the first 100a and second 100b sections of multilayer polymer pipes.

The insert 202 is configured such that, upon insertion into the end regions 105a, 105b, an annular gap 208 is formed between the insert 202 and the end regions 105a, 105b of the multilayer polymer pipe 100a, 100b. For example, an outer diameter of the insert 202 may be smaller than an inner diameter of the end regions 105a, 105b of multilayer polymer pipe. In this way, when the insert 202 is inserted into the end regions 105a, 105b, the annular gap 208 is formed between an outer surface of the insert 202 and an inner surface of the end regions 105a, 105b of multilayer polymer pipe.

As shown in FIGS. 2 and 3, a first end region 202a of the insert 202 is inserted into the end region 105a of a first pipe section 100a, and a second end region 202b of the insert 202 is inserted into the end region 105b of a second pipe section 100b. Each end region 202a, 202b of the insert may extend up to around six times the pipe internal diameter, but preferably less than four times the pipe internal diameter, and aptly less than three times the pipe internal diameter into the end region 105a, 105b of the corresponding pipe section 100a, 100b.

The adhesive 206 is configured for sealing the annular gap 208 that is formed between the insert 202 and the end regions 105a, 105b of multilayer polymer pipe. The adhesive 206 is configured for bonding to each of the insert 202 and the inner surface (e.g. the inner layer 102) of the end regions 105a, 105b of the multilayer polymer pipe sections 100a, 100b. In this way, the adhesive 206 seals the annular gap 208, and thereby protects exposed ends of each multilayer polymer pipe section 100a, 100b from fluid within the pipe bore 106. The adhesive 206 may be selected according to the material properties of the inner surface of the multilayer polymer pipe sections 100a, 100b and the insert 202. For example, where the inner layer of the multilayer polymer pipe sections 100a, 100b and the insert are polyamide (e.g. PA-12), the adhesive 206 may be any suitable polyamide-polyamide adhesive, as will be known to those skilled in the art. For example, the adhesive 206 may include any of an epoxy or a cyanoacrylate or two-part polyurethane or polyalkyl methacrylate. While polyamide is described as providing a suitable chemical barrier layer, it would be apparent it is not essential for the insert to comprise polyamide, and that other materials described herein would be suitable for providing a chemical barrier for the outer layer 104. Furthermore, it would be apparent that it is not essential that the insert 202 comprises the same material as the inner layer 104 of the multilayer polymer pipe 100.

The adhesive 206 may be provided in the annular gap 208 in various ways. For example, the adhesive 206 may be coated on the insert 202 or on the inner surface of the end regions 105a, 105b of the multilayer polymer pipe section 100a, 100b, prior to positioning of the insert 202 into the end regions 105a, 105b. For example, this may be done off-site at the time the insert is manufactured. In other examples, the insert may be manufactured without an adhesive, and the adhesive may be applied on site at the time of installation of the pipe sections. In some cases, the insert 202 includes a transfer sheet (not shown) for protecting the adhesive 206 during transit or storage prior to use. The transfer sheet is preferably disposed on the adhesive 206 and can be removed prior to installation of the insert 202 to provide the adhesive 206 for adhering the insert to the respective multilayer polymer pipe sections 100a, 100b. Alternatively, the adhesive 206 may be provided to the annular gap 208 after positioning of the insert 202 into the end regions 105a, 105b. For example, the adhesive 206 may be injected into the annular gap 208 via a suitable channel (not shown) after the first 100a and second 100b multilayer polymer pipe sections have been pushed on to the insert 202.

The external coupler 204 is configured for positioning over the end regions 105a, 105b of and joining together the ends of the multilayer polymer pipe 100a, 100b. The external coupler 204 is configured to join the end region 105a of the first multilayer polymer pipe section 100a to the end region 105b of the second multilayer polymer pipe section 100b. Aptly, the external coupler 204 extends around and along the ends of the multilayer polymer pipe sections 100a, 100b to provide the necessary seal around the outer surface of the join.

In this example, the external coupler 204 is an electrofusion coupler as is known in the art. The electrofusion coupler is configured to bond to the outer surface of the end regions 105a, 105b of the multilayer polymer pipe to thereby join the pipe sections 100a, 100b together.

The electrofusion coupler includes at least one conductive coil 210. The conductive coil 210 extends around the circumference of the external coupler 204. Electrical contacts 212a, 212b enable an electric current to be applied to the conductive coil 210. Upon application of current to conductive coil 210, heat is generated by the coil 210 to thereby heat the surrounding polymer of the electrofusion coupler and the adjacent pipe end regions 105a, 105b, such that the outer surfaces of the pipe end regions 105a, 105b bond to the inner surface of the electrofusion coupler. This provides a fluid-tight seal between the outer layers of adjacent multilayer polymer pipe sections 100a, 100b.

Figure 4:
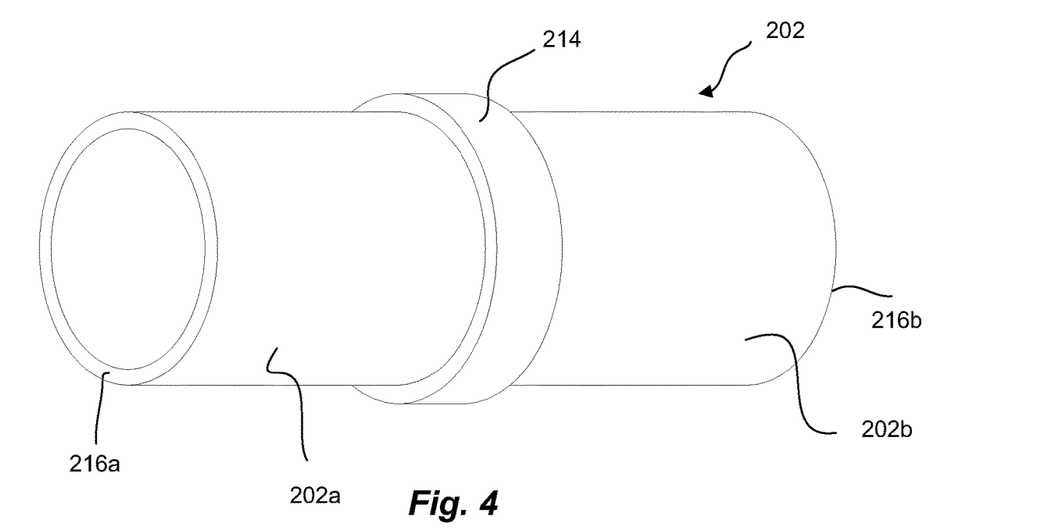
FIG. 4 illustrates the insert of the coupling assembly shown in FIGS. 2 and 3.

FIG. 4 illustrates the insert 202 in further detail. As shown, the insert 202 extends between a first end 216a and a second end 216b along a longitudinal axis ("A" in FIG. 2) and includes an annular flange 214 disposed between the first 216a and second 216b ends.

The annular flange 214 acts as a mechanical stop and facilitates the correct positioning of the pipe sections 100a, 100b relative to the insert 202. The outer surface of the insert 202 between the annular flange 214 and the first end 216a provides the first end region 202a.

The outer surface of the insert 202 between the annular flange 214 and the second end 216b provides the second end region 202b.

As illustrated in FIGS. 3 and 4, the annular flange 214 extends radially from the outer surface of the insert 202. Once the insert 202 is inserted sufficiently far into the first pipe section 100a, the end of the first pipe section 100a abuts the annular flange 214, indicating the first end region 202a of the insert 202 is correctly positioned within the end region 105a. Once the second pipe section 100b is passed over the second end region 202b of the insert 202 and the insert 202 is fully inserted into the second pipe section 100b, the end of the second pipe section 100b will abut the annular flange 214, indicating to a user that the insert 202 is correctly positioned within the pipe sections 100a, 100b.

The seal between the insert 202 and the respective inner layers of the first 100a and second 100b pipe sections ensures the fluid barrier layer is maintained across the connecting joints between adjacent pipes and thus provides a continuous fluid barrier layer along the length of the connected pipe. While the annular flange 214 is shown positioned substantially centrally along the insert 202, it would be apparent that this is not essential and that the annular flange 214 may be positioned at other longitudinal positions along the insert 202 as required.

Various modifications to the detailed arrangements as described above are possible. For example, as show in FIGS. 5 to 7, the insert 202 may be configured with different profiles.

Figure 5:
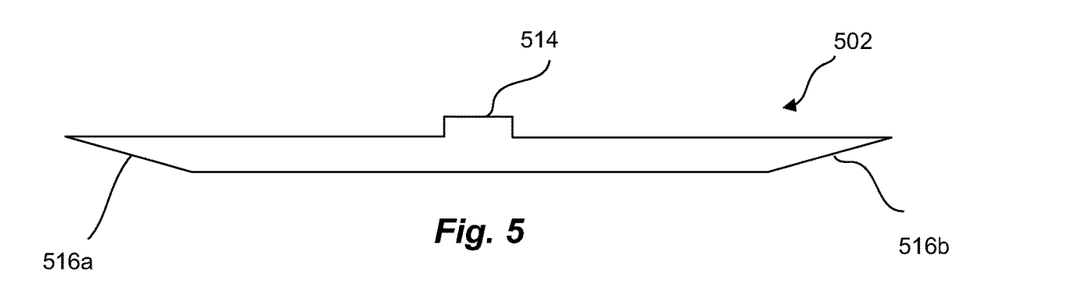

FIG. 5 illustrates a section of an insert 502 having an annular flange 514 and profiled ends 516a, 516b. Specifically, the ends 516a, 516b have a tapered profile. This reduces the turbulence in the fluid passing through the bore 106 of the pipe assembled during use. As shown, the profile tapers away from the annular flange 514 in a linear manner, such that the inner diameter of the insert 502 is smaller at the annular flange 514 than at the ends 516a, 516b of the insert 502. That is to say, the insert 502 tapers outwardly or radially from the longitudinal axis A.

Figure 6:
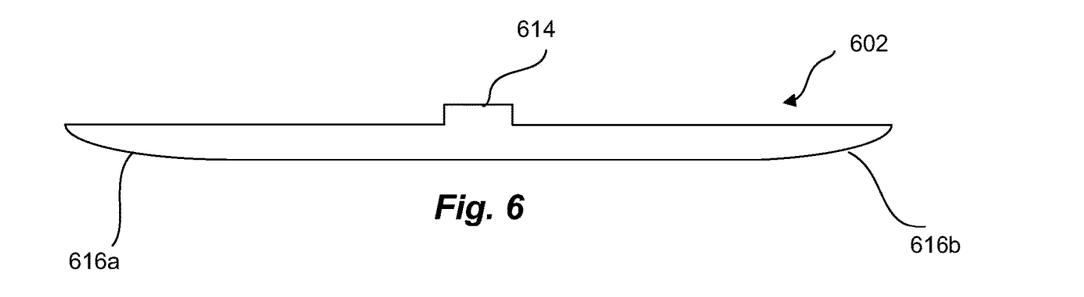
FIG. 6 illustrates a sectional view of another insert.

FIG. 6 illustrates an alternative insert 602 having an annular flange 614 and profiled ends 616a, 616b. The insert 602 has a profile that tapers away from the annular flange 614 in a non-linear manner. Specifically, the taper of insert 602 increases with distance from the annular flange 614.

While the inserts 502 and 602 have been described as having symmetrical ends 516a, 516b, 616a, 616b, it would be apparent this is not essential, and that the insert 502, 602 may have a first end 516a, 616a with a different profile to that at the second end 516b, 616b.

Figure 7:
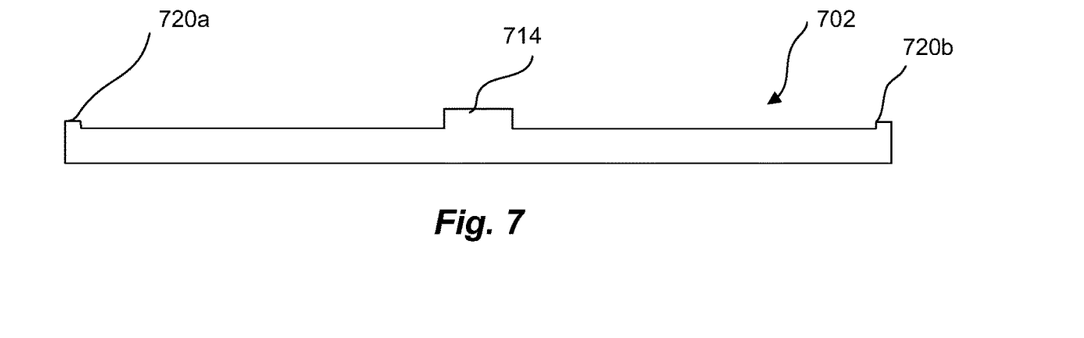
FIG. 7 illustrates a sectional view of another insert.

FIG. 7 illustrates a further exemplary insert 702 having an annular flange 714 and first 720a and second 720b annular lips on an outer surface of the insert 702. As shown, the first annular lip 720a is at a first end of the insert 702, and the second annular lip 720b is at a second end of the insert 702.

In use, the first 720a and second 720b annular lips retain the adhesive in the annular gap. In some examples, the first 720a and second 720b annular lips extend to the inner layer 104 of the pipe, thus retaining the adhesive within the annular gap. This is especially advantageous during insertion of the insert when the adhesive may accumulate towards the end of the pipe section as the insert is inserted, resulting in an uneven distribution of adhesive on the end region of the pipe sections.

It would be apparent that the annular lips 720a, 720b need not be provided at the end of the insert. In some cases it may be desirable to position the annular lips 720a, 720b at an intermediate position along the length of the insert 702. Similarly, it would be apparent that fewer or more than two annular lips may be provided on an insert depending on the requirements. For example, three or four annular lips may be provided along the length of the insert 702 to define multiple annular gaps for one or more adhesives. It would also be apparent that it is not essential for the same type of insert to be used in a pipe assembly comprising many pipe sections, and that different pipe section joints may benefit from having one type of insert over another.

It would be apparent that in order to facilitate the assembly and installation of the insert within the pipe sections 100a, 100b that a chamfer or radius may be applied to the outer diameter at both ends (for example at the ends 516a, 516b at the tip of the tapered profile).

It would also be apparent that the flange 214, 514, 614, 714 may be used also to locate the central portion of the electrofusion coupler. This may be facilitated through it's shape (locating into a shallow groove in the inner surface of the electrofusion coupler) or through interaction or connection means such as magnets, fasteners, pins, or the like.

Figure 8:
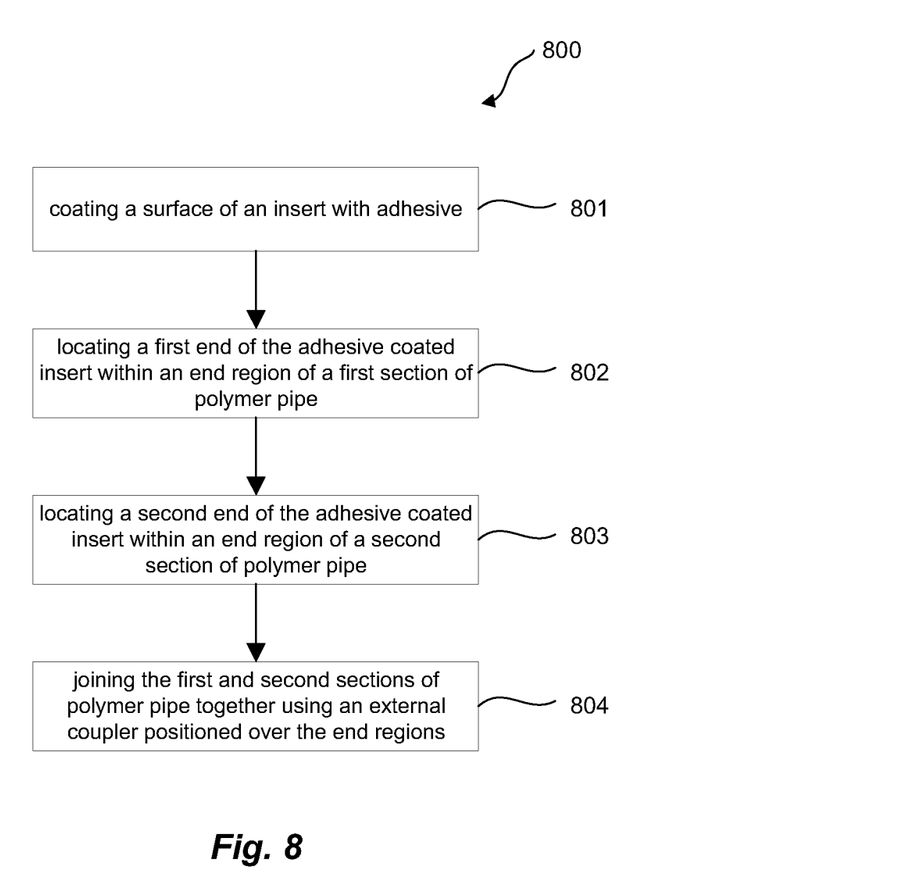
FIG. 8 illustrates a method of joining two sections of multilayer polymer pipe.

FIG. 8 illustrates an exemplary method 800 of joining two sections of multilayer polymer pipe sections. The method 800 includes coating 801 a surface of an insert with adhesive. The adhesive may be any of those described above. In some cases, the adhesive may be applied to the insert in advance of the installation of a pipe, and so a transfer sheet may be applied to the adhesive layer to protect the adhesive when the insert will be stored for a period of time before use on site. Once the insert is required, the transfer sheet can be removed and the insert installed in an efficient manner as the adhesive is already applied without further intervention from the user. This is an alternative approach to providing an insert that has no adhesive applied, and coating the adhesive on site when installing the insert.

Once the insert has been coated with adhesive, a first end of the insert may be located 802 within an end region of a first section of multilayer polymer pipe. A second end of the insert may then be located 803 within an end section of a second section of multilayer polymer pipe. For example, the second pipe, without an insert, can be pushed onto the insert, sliding over the adhesive surface that protrudes from the first pipe. This provides a pipe having a continuous liquid barrier layer on the inner surface of the pipe assembly. To ensure the pipes are correctly positioned, the first and second pipe sections can be pressed together, and where an annular flange is provided, the first and second pipe sections will abut the annular flange, indicating the pipes have been correctly positioned.

A user is then able to position an external coupler over the end regions to join 804 the first and second pipe sections together. The joint can be left to cure to form the fluid-tight seal. Once the first and second pipe sections have been joined together, fluid-tight seals will be formed on the inner and outer layers of the pipe. The user can then proceed to join further pipe sections until the required length of pipe has been formed.

Whilst the examples described above relate to a pipe coupling assembly for coupling a multi-layer polymer pipe such as that shown in FIG. 1, it will be appreciated that the coupling may also be used with multilayer polymer pipe having more than two layers, for example three layers, or four layers.

Whilst the examples described above include an electrofusion coupler, the described insert may be used in combination with any suitable external coupler, as will be known to those skilled in the art. For example, a mechanical coupler (for instance a swaged coupling) may be used that extends over and secures the end region of each pipe section.

The following clauses list non-limiting embodiments of the disclosure:

1. A pipe coupling assembly for joining two sections of multilayer polymer pipe, the pipe coupling assembly comprising:
   an insert configured for positioning within an end region of a first section of multilayer polymer pipe and an end region of a second section of multilayer polymer pipe, such that an annular gap is formed between the insert and the end regions of multilayer polymer pipe;
   an adhesive configured for sealing the annular gap between the insert and the end regions; and
   an external coupler for positioning over the end regions and joining the first and second sections of multilayer polymer pipe.

2. A pipe coupling assembly according to clause 1, wherein the insert comprises a mechanical stop for abutting against the end of at least one of the multilayer polymer pipe sections.

3. A pipe coupling assembly according to clause 2, wherein the mechanical stop comprises an annular flange extending from an outer surface of the insert.

4. A pipe coupling assembly according to clause 3, wherein the annular flange is positioned substantially centrally along the length of the insert.

5. A pipe coupling assembly according to clause 3 or clause 4, wherein the annular flange is configured to extend from an outer surface of the insert to the outer surface of the abutting multilayer polymer pipe, in use.

6. A pipe coupling assembly according to any preceding clause, wherein an inner surface of the insert tapers outwardly at each end region of the insert.

7. A pipe coupling assembly according to any preceding clause, wherein the insert comprises a first and second annular lip on an outer surface thereof for retaining the adhesive in the annular gap in use.

8. A pipe coupling assembly according to clause 7, wherein the first annular lip is positioned at a first end of the insert and the second annular lip is positioned at a second end of the insert.

9. A pipe coupling assembly according to clause 7 or clause 8, wherein each of the first and second annular lips are configured to extend from the outer surface of the insert to the inner surface of the multilayer polymer pipe.

10. A pipe coupling assembly according to any preceding clause, wherein the adhesive is configured for adhesion to at least one of: a polyamide, a Polyphenylene Sulfide (PPS), a polyketone, a Polyetherketoneketone (PEKK), a Polyetheretherketones (PEEK) or fluoropolymers including PFA, MFA, or PVDF.

11. A pipe coupling assembly according to any preceding clause, wherein the adhesive comprises at least one of an epoxy or a cyanoacrylate or two-part polyurethane or polyalkyl methacrylate.

12. A pipe coupling assembly according to any preceding clause, wherein the insert is configured such that the annular gap between the insert and the end regions of multilayer polymer pipe is from 0.4 millimetres to 6.5 millimetres, or from 0.8 millimetres to 1.6 millimetres.

13. A pipe coupling assembly according to any preceding clause, wherein the external coupler is an electrofusion coupler.

14. A pipe coupling assembly according to clause 13, wherein the electrofusion coupler is configured to bond to an outer surface of the end regions of multilayer polymer pipe.

15. A pipe coupling assembly according to any preceding clause, wherein the external coupler is a mechanical coupler.

16. A pipe coupling assembly according to any preceding clause, wherein the sections of polymer pipe are multilayer polymer pipe, and wherein the external coupler is configured to join outer layers of the multilayer pipe sections.

17. An insert comprising:
 a tubular body configured for positioning within an end region of a first section of polymer pipe and an end region of a second section of multilayer polymer pipe, such that an annular gap is formed between the tubular body and the end regions of multilayer polymer pipe, and
 an adhesive layer on an outer surface of the tubular body, wherein, in use, the adhesive layer seals the annular gap between the insert and the end region.

18. A multilayer polymer pipe assembly comprising:
 a first section of multilayer polymer pipe;
 a second section of multilayer polymer pipe;
 an insert positioned within an end region of the first section of multilayer polymer pipe and an end region of a second section of multilayer polymer pipe, such that an annular gap is formed between the insert and the end regions of multilayer polymer pipe;
 an adhesive sealing the annular gap between the insert and the end regions; and
 an external coupler positioned over the end regions and joining the first and second sections of multilayer polymer pipe.

19. A multilayer polymer pipe assembly according to clause 18, wherein the first and second sections of multilayer polymer pipe each comprise an inner layer an outer layer.

20. A multilayer polymer pipe assembly according to clause 19, wherein the inner layer comprises a chemical barrier layer.

21. A multilayer polymer pipe assembly according to clause 19 or clause 20, wherein the outer layer comprises a structural support layer.

22. A method of joining two sections of multilayer polymer pipe, the method comprising:
 providing a surface of an insert with an adhesive coating;
 locating a first end of the adhesive coated insert within an end region of a first section of multilayer polymer pipe and locating a second end of the adhesive coated insert within an end region of a second section of multilayer polymer pipe such that the adhesive seals an annular gap between the insert and the end regions; and
 joining the first and second sections of multilayer polymer pipe together using an external coupler positioned over the end regions.

23. A method according to clause 22, wherein the insert comprises a transfer sheet disposed on the adhesive coating, and wherein the step of providing the adhesive coating comprises removing the transfer sheet from the adhesive coating.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A multilayer polymer pipe assembly used in transporting and/or distributing oilfield fluid, at an internal pressure of up to 3000 psi, comprising:
 a first section and a second section of multilayer polymer pipe, the first and second sections of multilayer polymer pipe each comprising:
  an inner layer comprising a chemical barrier layer; and
  an outer layer comprising a structural support layer;

an insert positioned within an end region of the first section of multilayer polymer pipe and an end region of the second section of multilayer polymer pipe, such that an annular gap is formed between the insert and the end regions of multilayer polymer pipe;

an adhesive positioned internal to the end regions and sealing a surface of the insert and the annular gap between the insert and the end regions; and an external coupler positioned over the end regions and joining the first and second sections of multilayer polymer pipe, wherein the external coupler is an electrofusion coupler, and wherein the electrofusion coupler is configured to bond to an outer surface of the end regions of multilayer polymer pipe.

2. A multilayer polymer pipe assembly according to claim 1, wherein the insert comprises a mechanical stop for abutting against the end of at least one of the multilayer polymer pipe sections.

3. A multilayer polymer pipe assembly according to claim 2, wherein the mechanical stop comprises an annular flange extending from an outer surface of the insert.

4. A multilayer polymer pipe assembly according to claim 3, wherein the annular flange is positioned substantially centrally along the length of the insert.

5. A multilayer polymer pipe assembly according to claim 3, wherein the annular flange is configured to extend from an outer surface of the insert to the outer surface of the abutting multilayer polymer pipe, in use.

6. A multilayer polymer pipe assembly according to claim 1, wherein an inner surface of the insert tapers outwardly at each end region of the insert.

7. A multilayer polymer pipe assembly according to claim 1, wherein the insert comprises a first and second annular lip on an outer surface thereof for retaining the adhesive in the annular gap in use.

8. A multilayer polymer pipe assembly according to claim 7, wherein the first annular lip is positioned at a first end of the insert and the second annular lip is positioned at a second end of the insert.

9. A multilayer polymer pipe assembly according to claim 7, wherein each of the first and second annular lips are configured to extend from the outer surface of the insert to the inner surface of the multilayer polymer pipe.

10. A multilayer polymer pipe assembly according to claim 1, wherein the adhesive is configured for adhesion to at least one of: a polyamide, a Polyphenylene Sulfide (PPS), a polyketone, a Polyetherketoneketone (PEKK), a Polyetheretherketones (PEEK) or fluoropolymers including PFA, MFA, or PVDF.

11. A multilayer polymer pipe assembly according to claim 1, wherein the adhesive comprises at least one of an epoxy or a cyanoacrylate or two-part polyurethane or polyalkyl methacrylate.

12. A multilayer polymer pipe assembly according to claim 1, wherein the insert is configured such that the annular gap between the insert and the end regions of multilayer polymer pipe is from 0.4 millimetres to 6.5 millimetres.

13. A multilayer polymer pipe assembly according to claim 1, wherein the sections of polymer pipe are multilayer polymer pipe, and wherein the external coupler is configured to join outer layers of the multilayer pipe sections.

14. A method of joining two sections of multilayer polymer pipe, the method comprising:

providing a surface of an insert with an adhesive coating;

locating a first end of the adhesive coated insert within an end region of a first section of multilayer polymer pipe, the adhesive being positioned internal to the end region of the first section of the multilayer polymer pipe, and locating a second end of the adhesive coated insert within an end region of a second section of multilayer polymer pipe, the adhesive being positioned internal to the end region of the second section of the multilayer polymer pipe, such that the adhesive seals an annular gap between the insert and the end regions; and joining the first and second sections of multilayer polymer pipe together using an external coupler positioned over the end regions, the external coupler being an electrofusion coupler configured to bond to a first outer surface of the end region of the first section of the multilayer polymer pipe and to a second outer surface of the end region of the second section of the multilayer polymer pipe, wherein the joining of the first and second sections is sufficient to transport or distribute an oilfield fluid at an internal pressure of up to 3000 psi, and wherein the first section of the multilayer polymer pipe and the second section of the multilayer polymer pipe each comprise an inner layer comprising a chemical barrier layer and an outer layer comprising a structural support layer.

15. A method as claimed in claim 14, wherein the insert comprises a transfer sheet disposed on the adhesive coating, and the step of providing the adhesive coating comprises removing the transfer sheet from the adhesive coating.

* * * * *